US012002371B2

(12) United States Patent
Ryde et al.

(10) Patent No.: US 12,002,371 B2
(45) Date of Patent: Jun. 4, 2024

(54) NEUROMORPHIC CAMERAS FOR AIRCRAFT

(71) Applicant: Rockwell Collins, Inc., Cedar Rapids, IA (US)

(72) Inventors: Julian C. Ryde, East Hampton, CT (US); Weston J. Lahr, Sherwood, OR (US); Richard M. Rademaker, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 462 days.

(21) Appl. No.: 17/321,232

(22) Filed: May 14, 2021

(65) Prior Publication Data

US 2022/0366799 A1 Nov. 17, 2022

(51) Int. Cl.
*G08G 5/02* (2006.01)
*G06F 18/213* (2023.01)
*G06V 10/75* (2022.01)
*G06V 20/13* (2022.01)

(52) U.S. Cl.
CPC ........... *G08G 5/025* (2013.01); *G06F 18/213* (2023.01); *G06V 10/751* (2022.01); *G06V 20/13* (2022.01)

(58) Field of Classification Search
None
See application file for complete search history.

(56) References Cited

U.S. PATENT DOCUMENTS

| 8,825,306 | B2 | 9/2014 | Dankers |
| RE45,452 | E | 4/2015 | Kerr et al. |
| 9,674,413 | B1* | 6/2017 | Tiana ................. G02B 5/23 |
| 2017/0208292 | A1* | 7/2017 | Smits ................. G03H 1/0005 |
| 2019/0035290 | A1 | 1/2019 | Schneider et al. |
| 2019/0303648 | A1* | 10/2019 | Zhai ................. G06V 10/764 |
| 2020/0202559 | A1* | 6/2020 | Cramblitt ............ G05D 1/101 |
| 2022/0366799 | A1* | 11/2022 | Ryde ................. G06V 10/14 |

FOREIGN PATENT DOCUMENTS

| AU | 2008293060 A1 * | 4/2010 | ......... G06K 9/00771 |
| CA | 3058723 A1 * | 6/2020 | .......... G01C 21/005 |
| FR | 2908324 A1 * | 5/2008 | ............. A63F 13/00 |
| GB | 2427034 A * | 12/2006 | ............... G02F 1/33 |

(Continued)

OTHER PUBLICATIONS

Extended Search Report in European Application No. 22171304.3 dated Sep. 29, 2022, 7 pages.

(Continued)

*Primary Examiner* — Fekadeselassie Girma
(74) *Attorney, Agent, or Firm* — Suiter Swantz IP (57) ABSTRACT

An onboard aircraft landing system includes one or more event-based cameras disposed at known locations to capture the runway and visible surrounding features such as lights and runway markings. The event-based cameras produce a continuous stream of event data that may be quickly processed to identify both light and dark features contemporaneously, and calculate an aircraft pose relative to the runway based on the identified features and the known locations of the event-based cameras. Composite features are identified via the relative location of individual features corresponding to pixel events.

20 Claims, 11 Drawing Sheets

(56) References Cited

FOREIGN PATENT DOCUMENTS

| | | | | |
|---|---|---|---|---|
| GB | 2427282 A | * | 12/2006 | ............... G02F 1/33 |
| GB | 2471708 A | * | 1/2011 | ............. A63G 31/16 |
| JP | 2010055377 A | | 3/2010 | |
| KR | 101539065 B1 | | 7/2015 | |
| RU | 2550887 C2 | * | 5/2015 | |
| RU | 2654455 C1 | | 5/2018 | |
| WO | WO-0065846 A1 | * | 11/2000 | ............... H04N 5/74 |
| WO | WO-2012115594 A1 | * | 8/2012 | ......... G06K 9/00771 |

OTHER PUBLICATIONS

Guillermo Gallego et al: "Event-based Vision: A Survey", Apr. 17, 2019 (Apr. 17, 2019), pp. 1-25, XP055752750, Retrieved from the Internet: URL:https://arxiv.org/pdf/1904.08405v1.pdf [retrieved on Nov. 20, 2020].

Hagenaars Jesse J et al: "Evolved Neuromorphic Control for High Speed Divergence-Based Landings of MAVs", IEEE Robotics and Automation Letters, IEEE, vol. 5, No. 4, Jul. 24, 2020 (Jul. 24, 2020), pp. 6239-6246, XP011805516, DOI: 10.1109/LRA.2020.3012129 [retrieved on Aug. 10, 2020].

Pijnacker Hordijk Bas J. et al: "Vertical landing for micro air vehicles using event-based optical flow", Journal of Field Robotics, vol. 35, No. 1, Nov. 10, 2017 (Nov. 10, 2017), pp. 69-90, XP055961876, us ISSN: 1556-4959, DOI: 10.1002/rob.21764Retrieved from the Internet: URL:https://api.wiley.com/onlinelibrary/td m/vl/articles/10.1002%2Frob.21764>.

Scheper, Kirk Y.W. et al., "Evolution of Robust High Speed Optical-Flow-Based Landing for Autonomous MAVs", Robotics and Autonomous Systems, vol. 124, 2020, 103380, ISSN 0921-8890, https://www.sciencedirect.com/science/article/pii/S0921889019302404, Dec. 16, 2019, 15 pages.

* cited by examiner

NEUROMORPHIC CAMERAS FOR AIRCRAFT

BACKGROUND

Real-time processing of continuous, high-dimension signals provided by vision sensors (cameras) is challenging in terms of computational power and sophisticated algorithms required to extract relevant information. Furthermore, point-like light sources are more quickly identified than lower-light features which require longer exposure time; it is difficult or impossible to correlate light and dark features in time which reduces overall instantaneous pose accuracy due to the poor dynamic range of standard frame-based cameras. Likewise, the longer exposure time for lower light features and all features in general results in significant motion blur which reduces position accuracy of the identified features.

All of these limitations hinder computer vision-based auto-landing of aircraft in all illumination conditions as images of the runway as an aircraft approaches include very bright elements (approach lights) and dark regions (runway surface). Therefore, existing landing systems require significant airport infrastructure and provide a reduced aircraft landing frequency. It would be advantageous to have a system that quickly identifies both lights and low-light features in substantially similar time frames with high positional accuracy that could provide onboard landing capability without airport infrastructure.

SUMMARY

In one aspect, embodiments of the inventive concepts disclosed herein are directed to an onboard aircraft system including one or more event-based cameras disposed at known locations to capture the runway and visible surrounding features such as lights and runway markings. The event-based cameras produce a continuous stream of event data that may be quickly processed to identify both light and dark features contemporaneously, and calculate an aircraft pose relative to the runway based on the identified features and the known locations of the event-based cameras.

In a further aspect, composite features are identified via the relative location of individual features corresponding to pixel events.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to an onboard aircraft system including one or more event-based cameras disposed at known locations to capture the runway and visible surrounding features such as lights and runway markings. The event-based cameras produce a continuous stream of event data that may be quickly processed to identify both light and dark features contemporaneously, and calculate an aircraft pose relative to the runway based on the identified features and the known locations of the event-based cameras. Composite features are identified via the relative location of individual features corresponding to pixel events.

Figure 1:
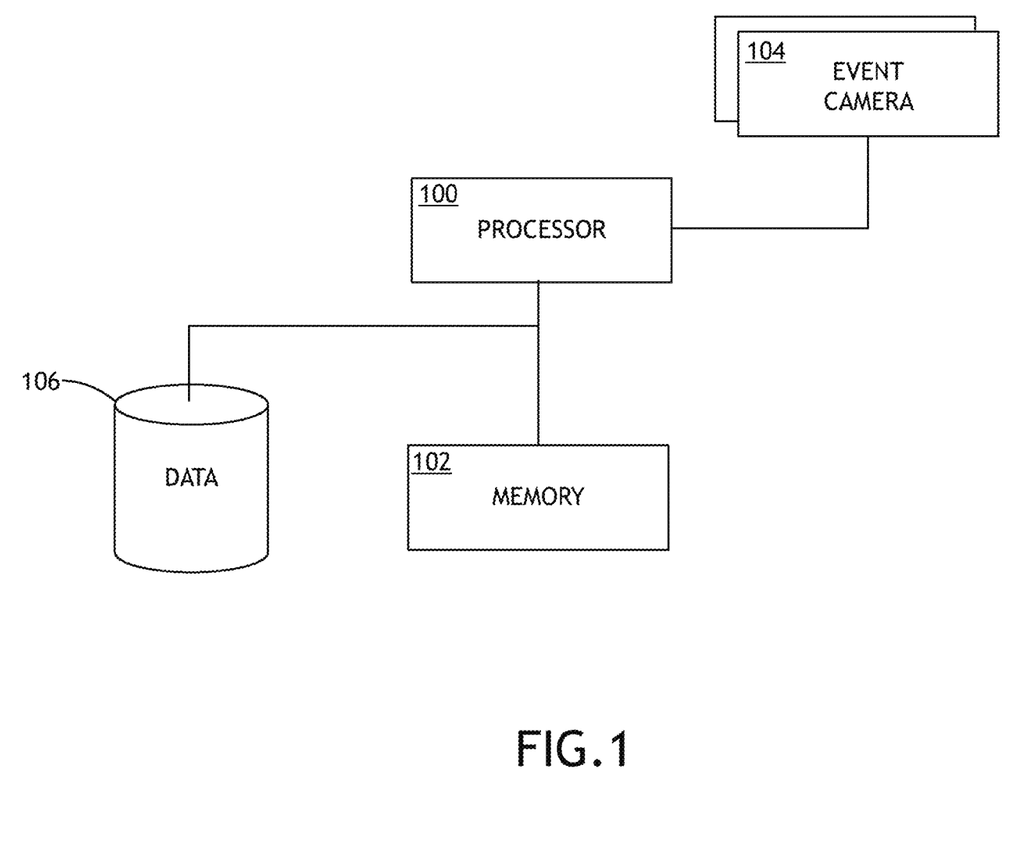
FIG. 1 shows a block diagram of a system for implementing an exemplary embodiment.

Referring to FIG. 1, a block diagram of a system for implementing an exemplary embodiment is shown. The system includes a processor 100 and memory 102 for embodying processor executable code. One or more event-based cameras 104 are connected to the processor 100 to provide a stream of pixel change events. The processor 100 is configured to identify features in an image based on pixel change events and correlate those features to known features of an airfield. The processor 100 produces a pose of the aircraft based on observed, relative locations of the identified features and their known or projected locations either stored in a data storage element 106 or known, standard relative locations of features such as lights and runway landmarks.

The processor 100 is configured to identify point-like features (light sources or other features that involve a single pixel or small clusters of pixels) and edges (features that involve a substantially continuous set of pixels). Event-based cameras 104 produce a stream of values, each associated with a specific pixel. Changes to a pixel value produce an event registered by the processor 100; as the platform (and corresponding event-based cameras 104) move in space, features are focused onto different parts of the camera sensor. Event-based cameras 104 operate at a much faster frequency than traditional cameras; therefore, the relative movement of features is conceptualized as a line for point-like features and a surface for edge features. That is to say as the platform moves, the point-like sources are focused on different pixels in the sensor, each of which produces an event as the pixel value changes when the point-like source is newly focused on that pixel; because of the high refresh rate of the event-based cameras 104, even relatively fast changes in position are represented as substantially straight lines in an x/y-time space. Similarly, edges are represented by substantially continuous surfaces in the x/y-time space as the platform moves. In an N dimensional image, features become N+1 dimension space-time features. Detecting lines in the x/y-time space allows detection of lights and low-light features regardless of relative motion.

The processor 100 executes an algorithm to identify point-like sources by identifying straight lines in the x/y-time space. In at least one embodiment, the processor 100 produces a pose estimate based on the relative disposition of a plurality of identified point-like sources and their known real-world locations. In at least one embodiment, the processor 100 also executes an algorithm to identify edges features by identifying surfaces in the x/y-time space.

Algorithms for identifying point-like sources via straight lines in the x/y-time space may include random sample consensus (RANSAC), Hugh transform, or other feature extraction techniques. In at least one embodiment, RANSAC is preferred to a Hugh transform because a Hugh transform requires four parameters for 3D line, so an accumulator array becomes very large. By comparison, RANSAC is an anytime algorithm and is non-deterministic. Standard line RANSAC detects lines embedded in x/y-time space surfaces which correspond to image edges.

In at least one embodiment, line detection in the x/y-time space includes identifying isolated strings of plot points surrounded by a substantially empty annular space. The line detection algorithm may be defined by an inner radius the defines a proximity for plot points to be construed as part of the line, and an outer radius that defines the annular space. Adjusting the inner radius and outer radius may identify lines with greater or lesser sensitivity (successfully identifying real lines) and greater or lesser specificity (successfully excluding false lines).

In at least one line, collections of lines having a relatively fixed location and/or orientation with respect to each other may define composite features (such as collections of runway lights). The processor 100 may be configured to identify such composite features via the disposition of multiple lines in the x/y-time space. In at least one embodiment, the processor 100 may be configured to implement a trained neural network to identify features via lines in the x/y-time space or composite features via identified lines, or both.

In at least one embodiment, an aircraft landing system utilizes the pose estimate in real-time to execute a landing procedure without the use of external navigational aids.

Figure 2:
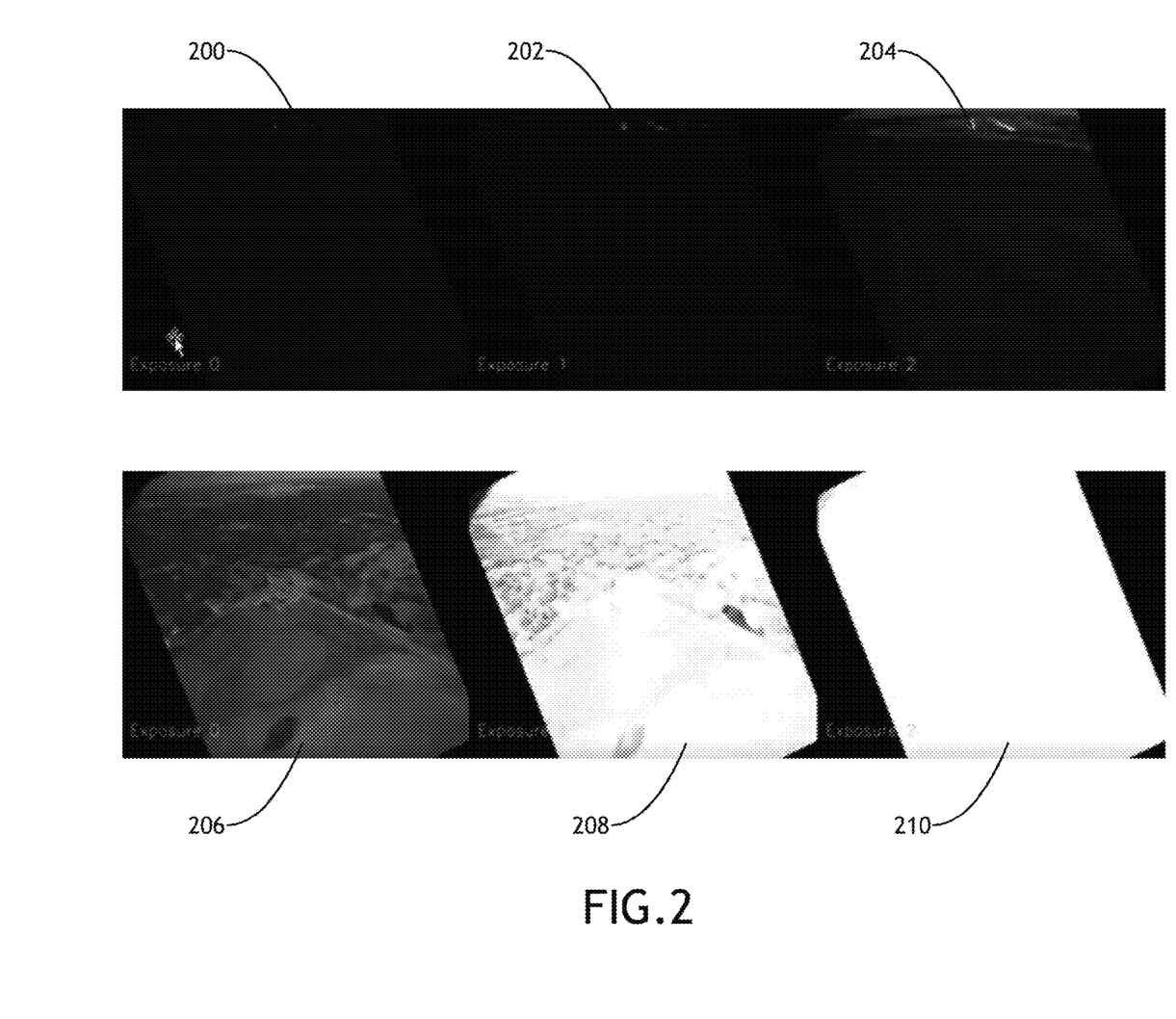
FIG. 2 shows representative camera images at different exposures.

Referring to FIG. 2, representative camera images 200, 202, 204, 206, 208, 210 at different exposures is shown. It may be appreciated that under certain conditions, traditional camera exposure settings may be used to identify light sources in an aircraft landing process (such as the increasing low-light exposures 200, 202, 204). The settings that are effective when identifying light sources are substantially less effective when identifying low light features. Exposure settings that would be effective when identifying low-light features would be overexposed by light sources (such as the increasing exposures 206, 208, 210). Identifying low-light features with traditional cameras requires multiple exposures or exposures over an extended period of time. Such processes cause motion blur that negatively impacts the accuracy of pose estimates based on features identified in such images. Furthermore, light sources may be identified via short exposures while low-light features require longer exposure, meaning the identified locations of light sources and low-light features are difficult to correlate in time and use accurately in pose estimates.

Figure 3:
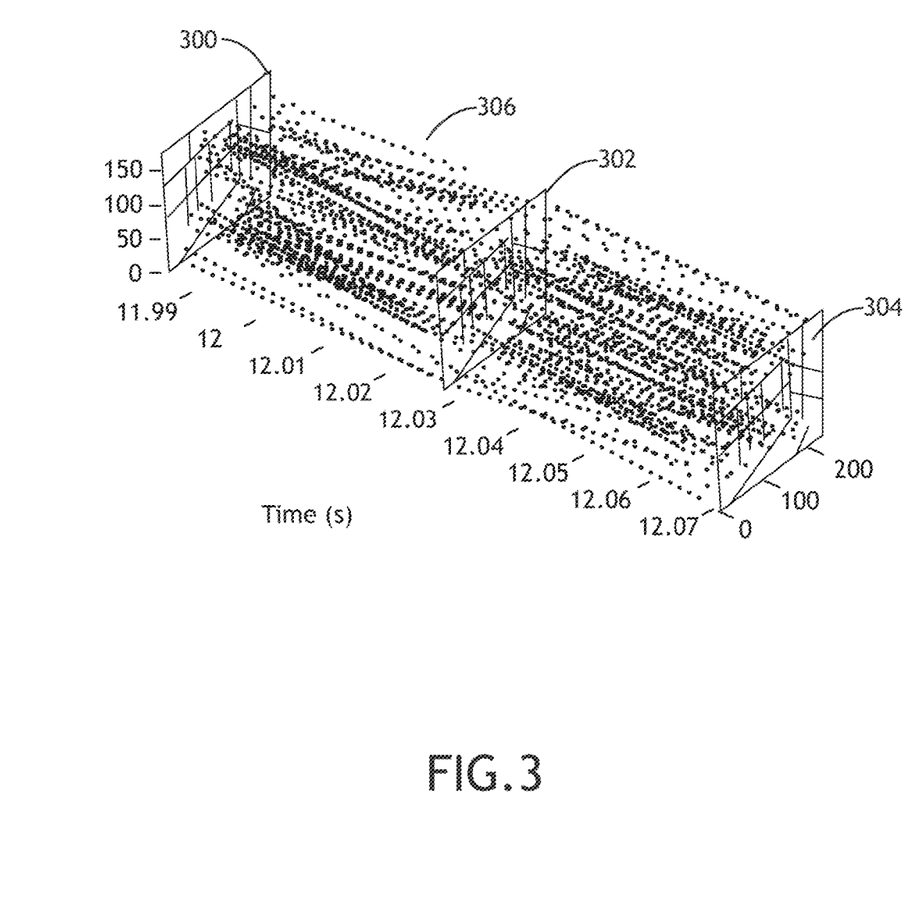
FIG. 3 shows a representation of pixel events from an event-based camera useful for exemplary embodiment.

Referring to FIG. 3, a representation of pixel events from an event-based camera useful for exemplary embodiment is shown. Neuromorphic event-based camera sensors mimic the sensing and early visual-processing characteristics of living organisms. Images 300, 302, 304 are represented over time as pixel change events 306 where each pixel produces an event whenever the pixel value changes. In a moving scene (or on a moving platform), where settings are configured for threshold light level, the pixel change events 306 may correspond to a light source or low-light feature moving across the surface of the sensor which are then represented as lines or surfaces in an x/y-time space. Processing via pixel change events reduces computational load required for visual perception by extracting only information relevant to post-processing stages.

Event-based/neuromorphic cameras confer several operational advantages over conventional frame-rate cameras, including lower power, both in the sensor and follow-on computations, data rates, and bandwidth, while enabling higher frame rates and dynamic range. Additional it solves the problem where the high apparent motion of the ground introduces significant motion blur especially at lower ambient illumination levels.

Figure 4:
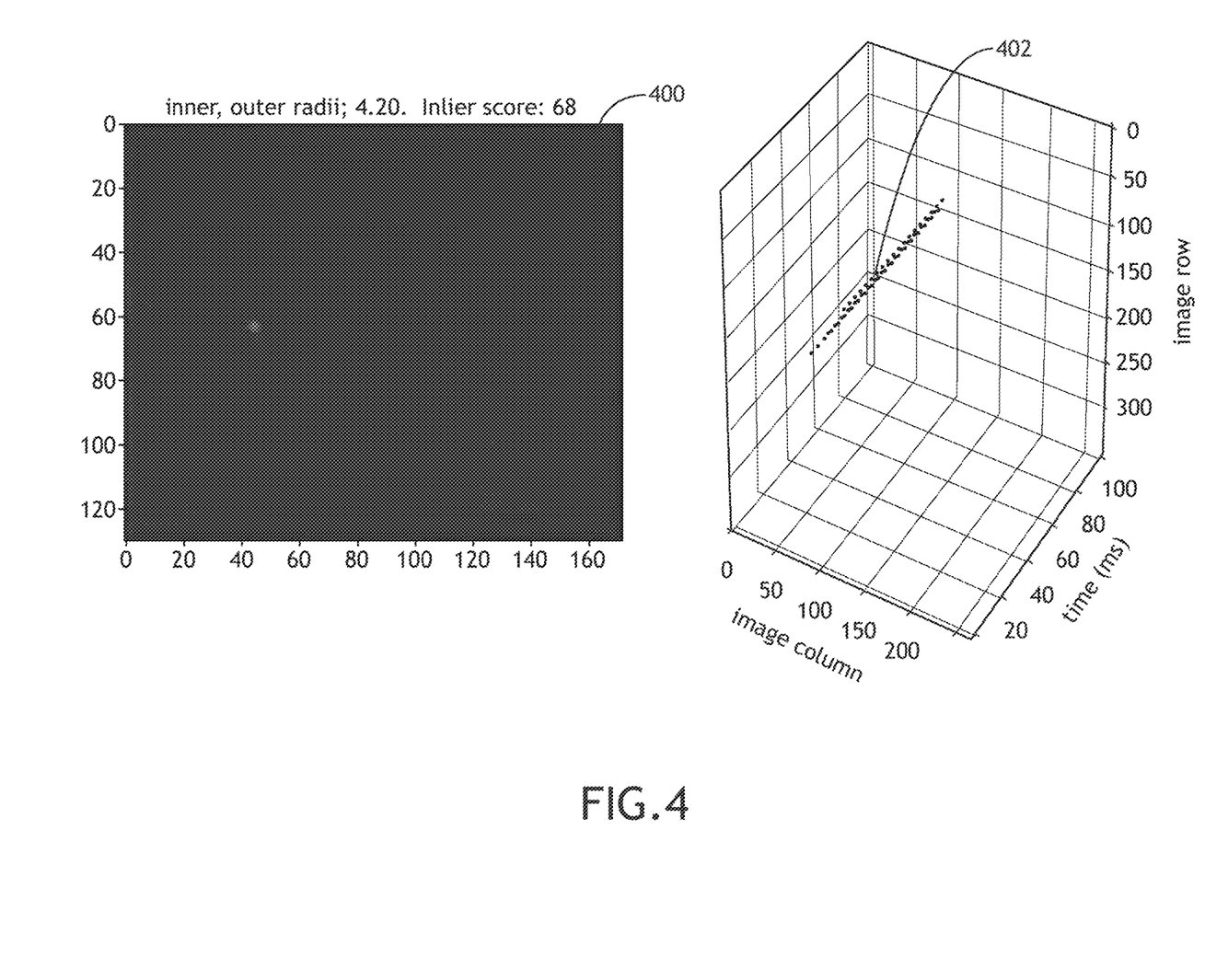
FIG. 4 shows a representation of an image and pixel events produced by the image over time.
Figure 5A:
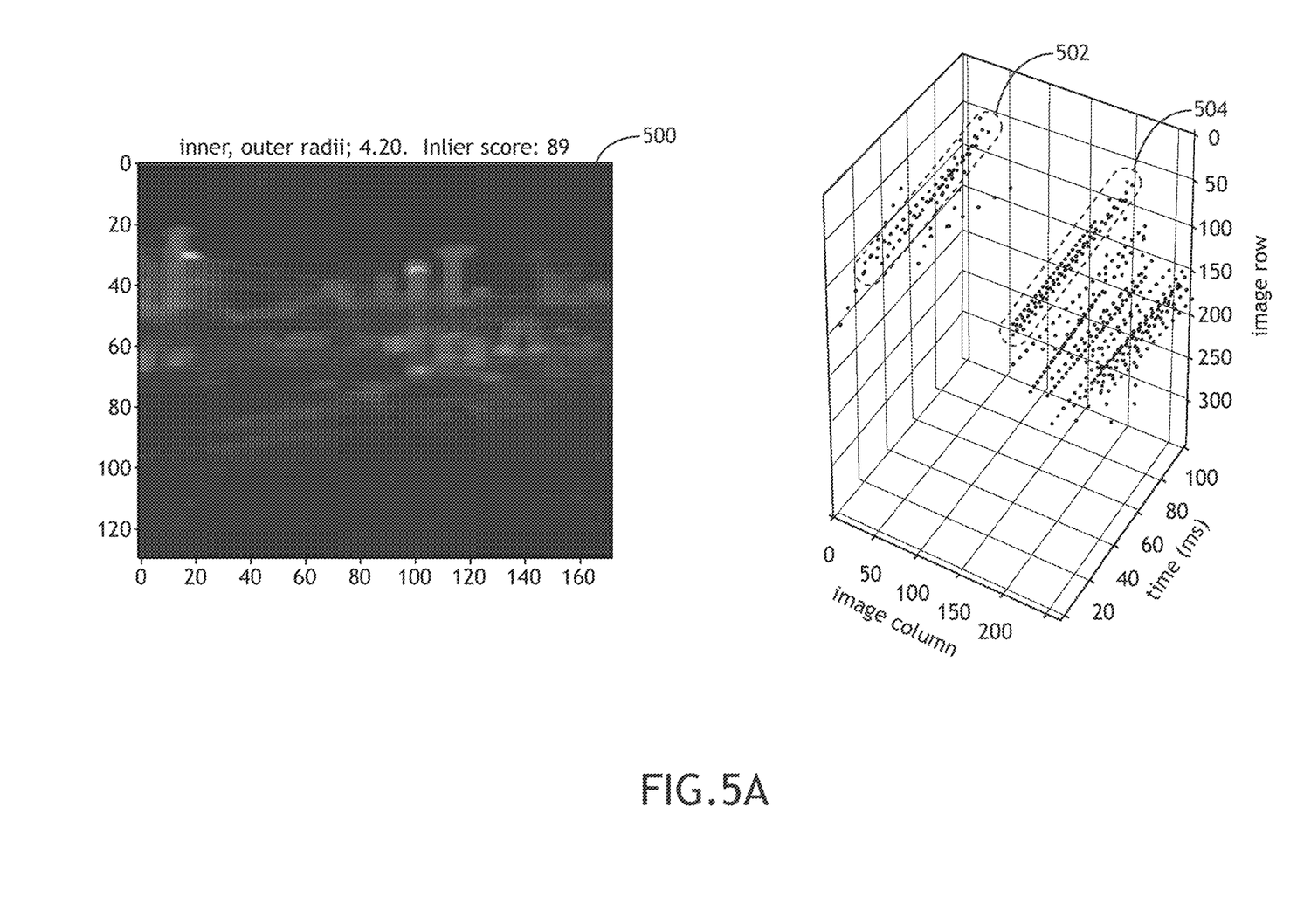
FIG. 5A shows a representation of an image and pixel events produced by the image over time.
Figure 5B:
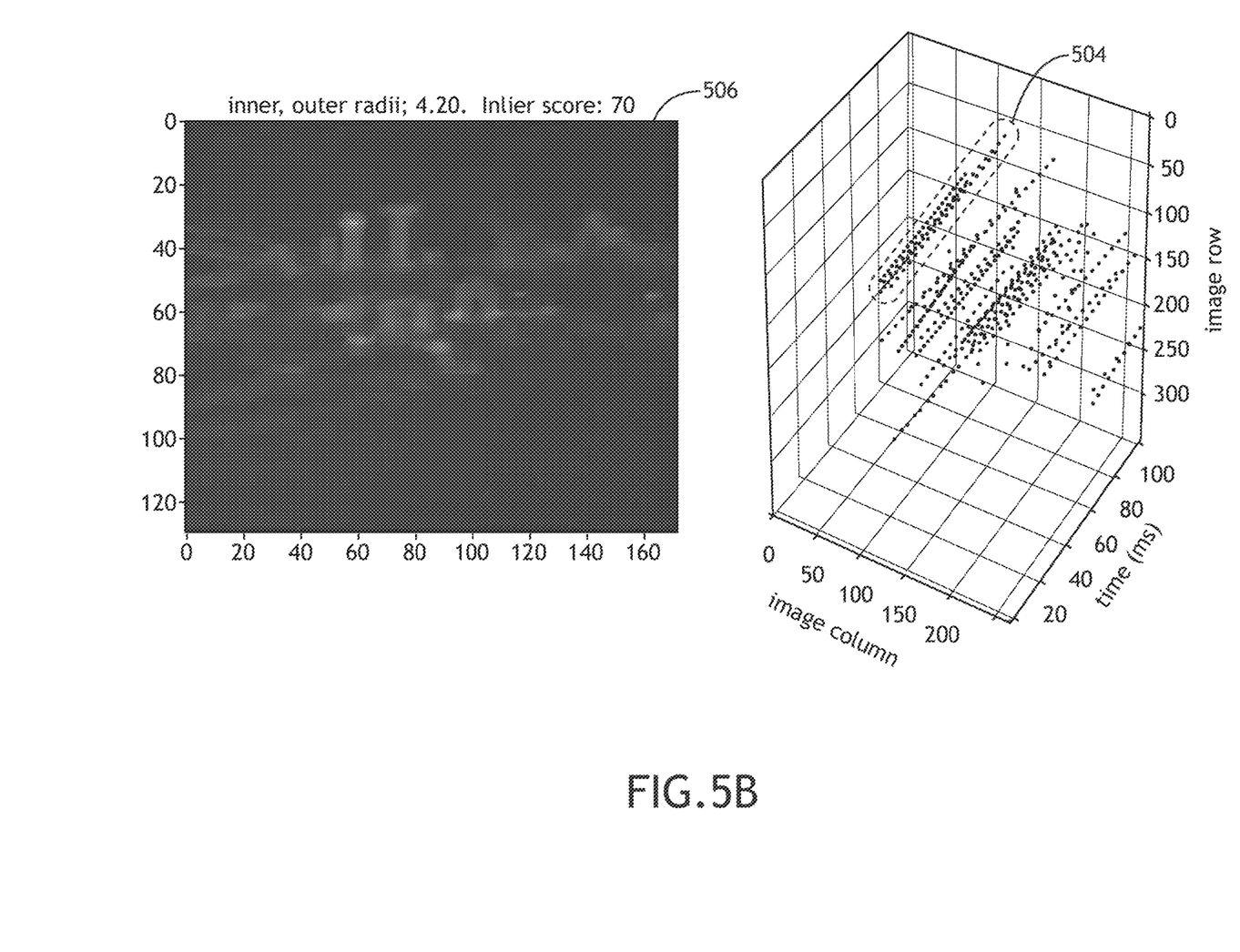
FIG. 5B shows a representation of an image and pixel events produced by the image over time.
Figure 5C:
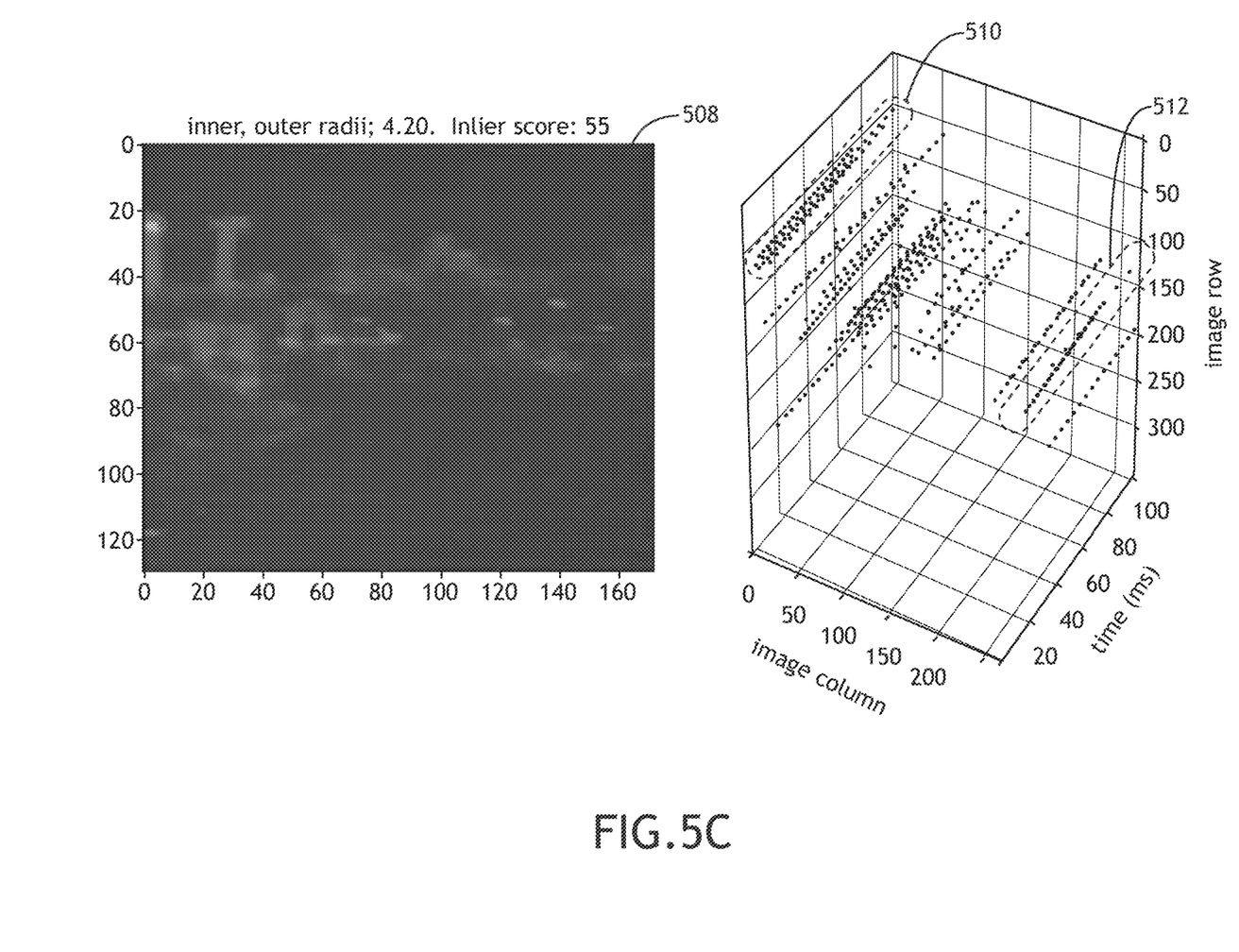
FIG. 5C shows a representation of an image and pixel events produced by the image over time.
Figure 5D:
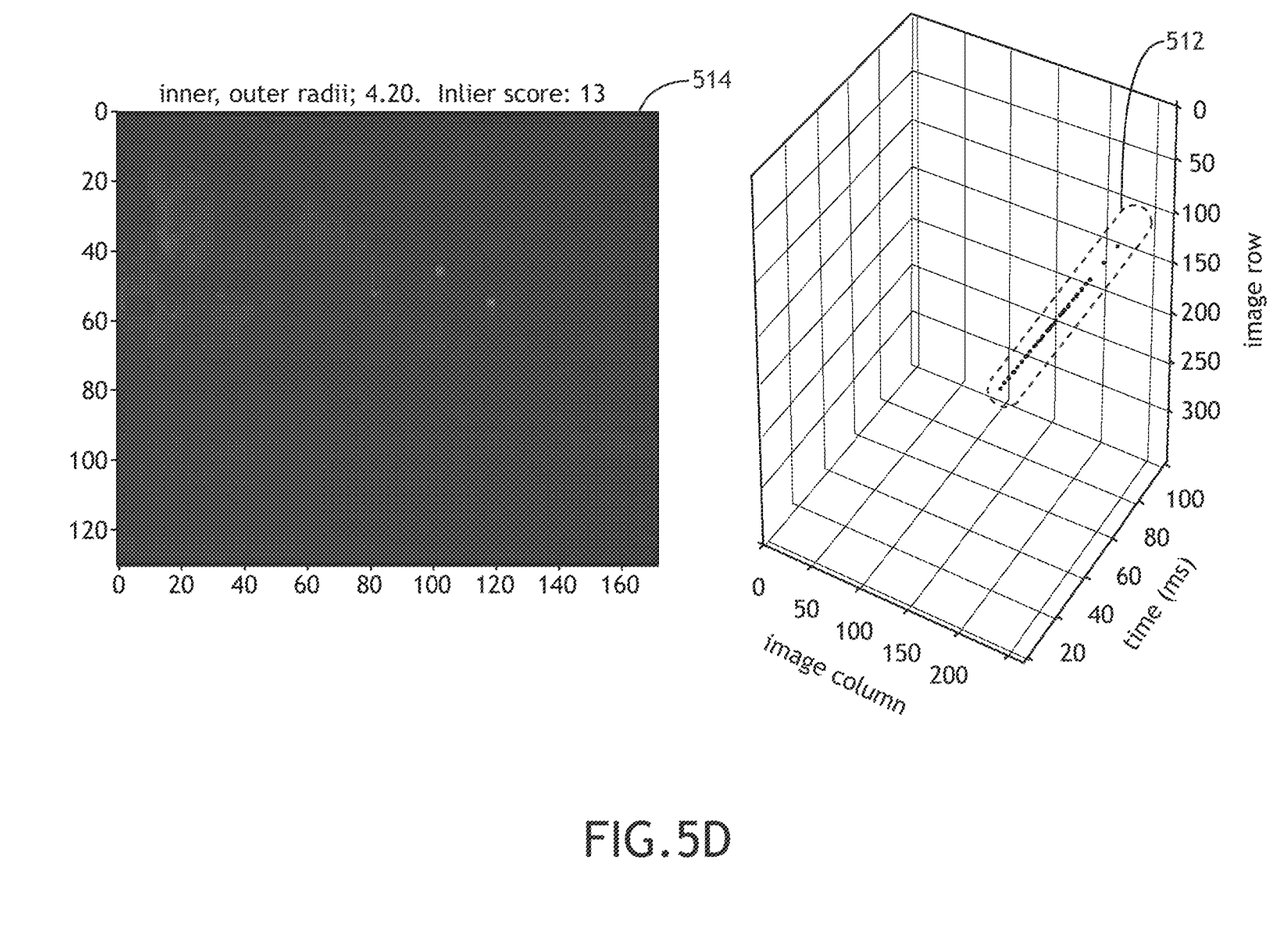
FIG. 5D shows a representation of an image and pixel events produced by the image over time.
Figure 5E:
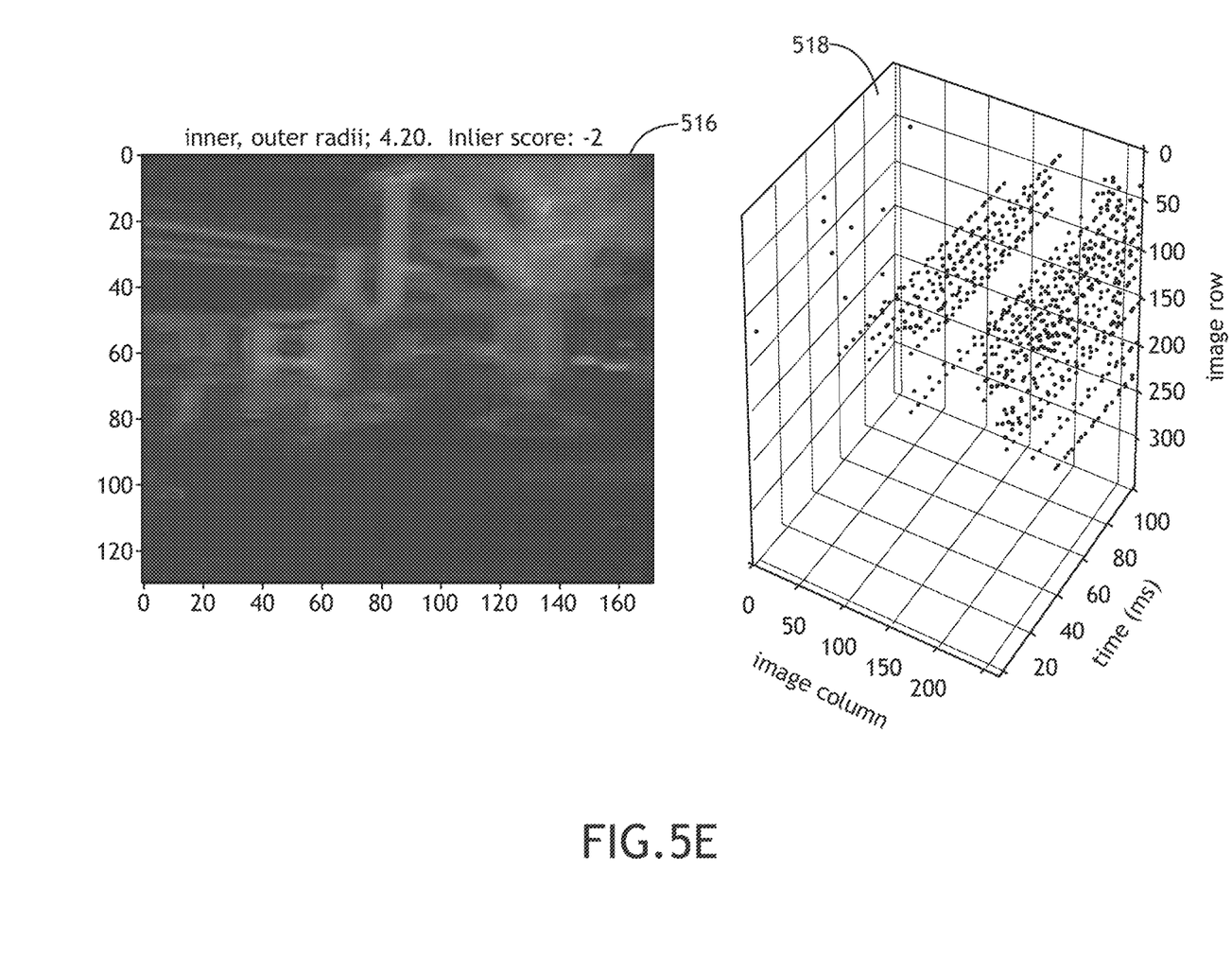
FIG. 5E shows a representation of an image and pixel events produced by the image over time.

Referring to FIG. 4, a representation of an image 400 and pixel events produced by the image over time is shown. During a RANSAC processes, pixel change events from an event-based camera are used to identify a light source by identifying a line 402 in an x/y-time space. The RANSAC process utilizes inner and outer radius values to produce a best fit model for a line 402 corresponding to inlier data points. The line 402 may correspond to an inlier score corresponding to a confidence in the best fit model based on the number of inlier data points and outlier data points.

Referring to FIGS. 5A-5E, representations of images and pixel events produced by the images over time are shown. As a mobile platform include one or more event-based cameras scans across a scene over time, the event-based cameras produce pixel change events corresponding to images 500, 506, 508, 514, 516. A RANSAC process or other feature identifying algorithm identifies lines 502, 504, 510, 512 in an x/y-time space 518 corresponding to pixel change events produced by individual features as the features transit across the event-based camera sensor and produce pixel change events in neighboring pixels.

Because features are identified solely by pixel change events that do not require multiple or extended exposures, both light sources and low-light features are identified contemporaneously. The light sources and low-light features may thereby be correlated in time for pose estimation. Furthermore, because they do not require multiple or extended exposures, detection of low-light features is not subject to motion blur which adversely impacts the accuracy of the feature position. It may be appreciated that settings such as inner and outer radii may be adjusted in real-time as dictated by light levels and other environmental variables, and dynamic inlier scores to more effectively identify features for an aircraft landing system.

In at least one embodiment, a system implementing embodiments of the present disclosure may include noise reduction by volumetric filtering in the x/y-time space.

At the limit of event-based camera resolution, objects are assumed to be far away. Where R is the distance to the object; s is the size of the object; v is the velocity of the object; σ is the pixel bandwidth of the vision sensor (4-10 KHz); dθ is the angular resolution of the vision sensor; and ω is the instantaneous tangential angular velocity of the object with respect to the vision sensor, at maximum R object spans one pixel; $\omega=\sigma d\theta$; $v=\omega=\sigma d\theta s/d\theta=\sigma s$. At the maximum resolution distance, dθ may be approximated by s/R and velocity v=ωR. For example, using a Davis 346 camera with pixel bandwidth of 5 KHz, a bullet of approximately 0.05 m can be detected at approximately 250 m/s while a car of approximately 5 m can be detected at approximately 25,000 m/s.

Figure 6:
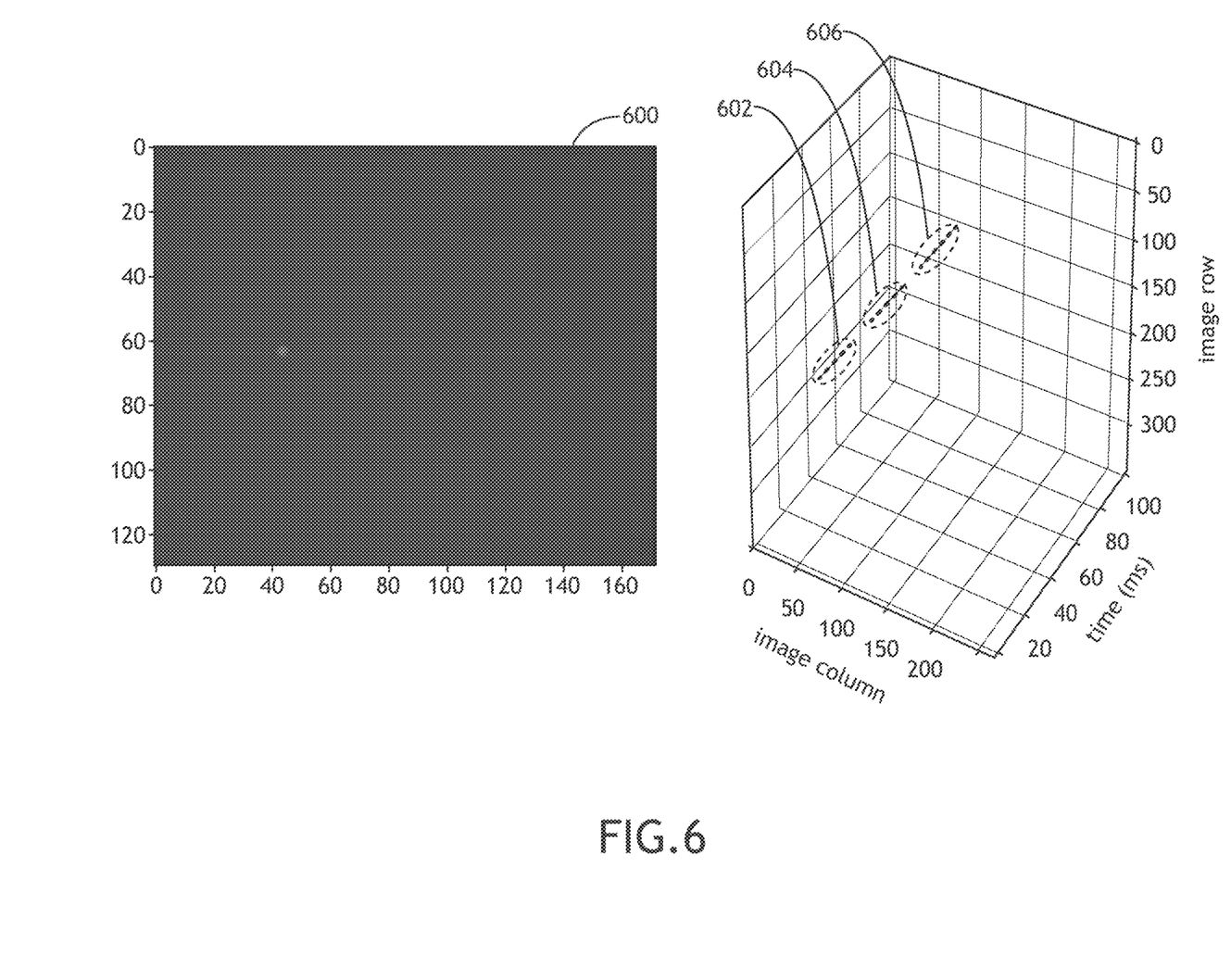
FIG. 6 shows a representation of an image of a flashing light source and pixel events produced by the image over time.

Referring to FIG. 6, a representation of an image of a flashing light source and pixel events produced by the image over time is shown. In an image stream 600 with a flashing LED source, the flashing frequency is generally too fast to be detected by traditional object detection. However, event-based cameras operate at a sufficiently high refresh rate to observe distinct pixel change events 602, 604, 606 due to LED flashing. The rate of such distinct pixel change events 602, 604, 606 may further enhance line detection as LED flashing is unlikely to be mistaken for a natural phenomenon. In some embodiments, where the detection algorithm is configured to identify flashing LED sources, other parameters may be configured with tighter tolerances than otherwise possible. Furthermore, where a system includes stored parameters specific to individual air fields, the known existence of flashing LEDs may be a characteristic feature to quickly identify an airfield and produce a pose estimate.

Figure 7:
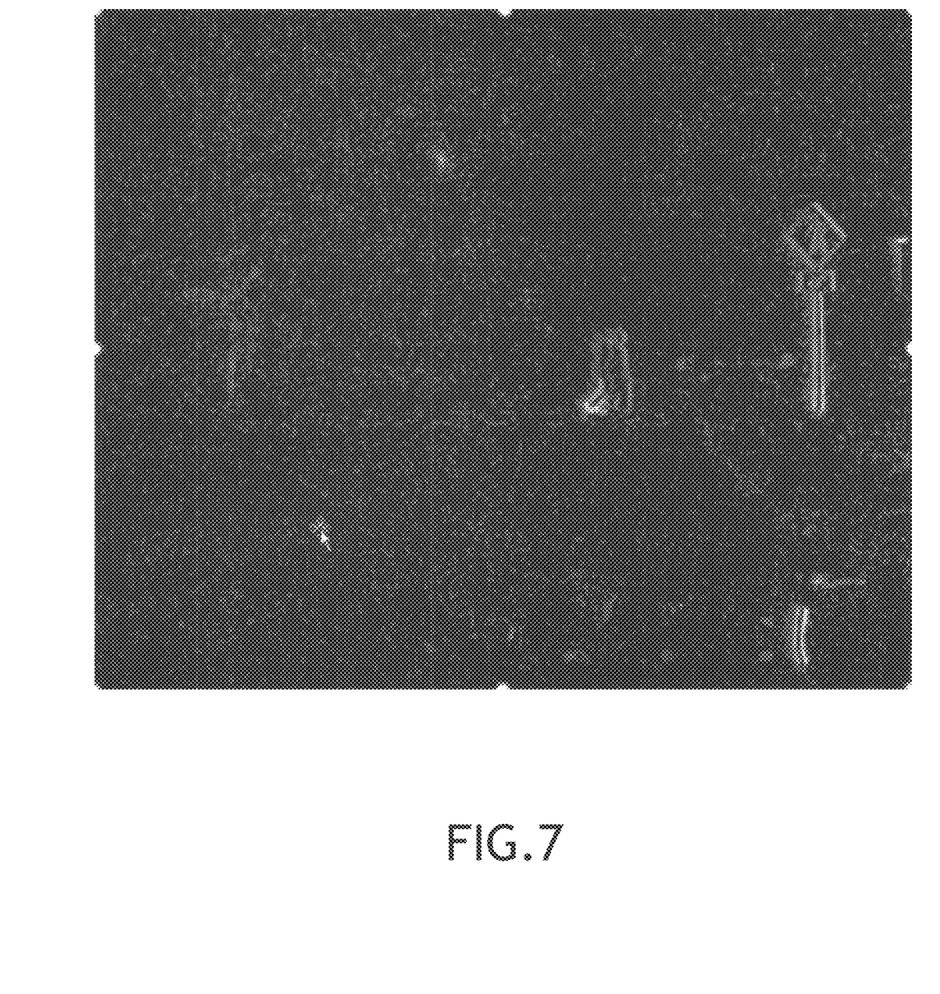
FIG. 7 shows a representation of pixel events in a low-light image.

Referring to FIG. 7, a representation of pixel events in a low-light image is shown. Embodiments of the present disclosure may be suitable for identifying pedestrians or other features in a low light environment where light sources may tend to saturate traditional camera sensors and obscure low-light features. Fast edge and point detection via event-based cameras allow low-light features and light sources to be identified contemporaneously, with little or no motion blur, thereby enhancing the speed and accuracy of calculations utilizing poses determined with respect to those features.

Embodiments of the present disclosure are useful for aircraft landing systems that require high availability and extremely high reliability (failure rate less than $10^{-9}$ and a pathway to certification. Such embodiments utilize existing visual infrastructure markings and lights. Embodiments enable landing at category I/II airports without upgrades, enabling single pilot operations and fully autonomous operations without need for ground infrastructure.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A computer apparatus comprising:
   one or more event-based cameras; and
   at least one processor in data communication with the one or more event-based cameras and a memory storing processor executable code for configuring the at least one processor to:
   receive a continuous stream of pixel change events from each of the one or more event-based cameras;
   identify one or more light sources via the continuous stream of pixel change events;
   identify one or more low-light features via the continuous stream of pixel change events; and
   determine a pose estimate for a platform including the one or more event-based cameras based on the identified one or more light sources and the identified one or more low-light features, wherein the one or more light sources and identified one or more low-light features are related by known, standard relative locations.

2. The computer apparatus of claim 1, wherein the at least one processor is further configured to identify at least one composite feature based on a relative disposition of two or more of the identified light sources and identified low-light features.

3. The computer apparatus of claim 1, wherein the at least one processor is further configured to identify a flashing LED light source.

4. The computer apparatus of claim 1, wherein identifying the one or more light sources comprises executing a random sample consensus algorithm.

5. The computer apparatus of claim 4, wherein the at least one processor is further configured to organize pixel change events in an x/y-time space.

6. The computer apparatus of claim 1, wherein the at least one processor is further configured to identify one or more edge features via the continuous stream of pixel change events.

7. The computer apparatus of claim 1, wherein the at least one processor is further configured to correlate locations of the identified light sources and the identified low-light features in time based on time stamps of the pixel change events.

8. An aircraft landing system comprising:
   one or more event-based cameras disposed at known locations on an aircraft to capture images of a runway during a landing procedure; and
   at least one processor in data communication with the one or more event-based cameras and a memory storing processor executable code for configuring the at least one processor to:
      receive a continuous stream of pixel change events from each of the one or more event-based cameras;
      identify one or more light sources via the continuous stream of pixel change events;
      identify one or more low-light features via the continuous stream of pixel change events; and
      determine a pose estimate for the aircraft based on the identified one or more light sources and the identified one or more low-light features, wherein the one or more light sources and identified one or more low-light features are related by known, standard relative locations.

9. The aircraft landing system of claim 8, wherein the at least one processor is further configured to identify at least one composite feature based on a relative disposition of two or more of the identified light sources and identified low-light features.

10. The aircraft landing system of claim 8, wherein the at least one processor is further configured to identify a flashing LED light source.

11. The aircraft landing system of claim 8, wherein identifying the one or more light sources comprises executing a random sample consensus algorithm.

12. The aircraft landing system of claim 11, wherein the at least one processor is further configured to organize pixel change events in an x/y-time space.

13. The aircraft landing system of claim 8, wherein the at least one processor is further configured to identify one or more edge features via the continuous stream of pixel change events.

14. The aircraft landing system of claim 8, wherein the at least one processor is further configured to correlate locations of the identified light sources and the identified low-light features in time based on time stamps of the pixel change events.

15. A method for determining an aircraft pose estimate comprising:
   receiving a continuous stream of pixel change events from one or more event-based cameras;
   identifying one or more light sources via the continuous stream of pixel change events;
   identifying one or more low-light features via the continuous stream of pixel change events; and
   determining a pose estimate for the aircraft based on the identified one or more light sources and the identified one or more low-light features, wherein the one or more light sources and identified one or more low-light features are related by known, standard relative locations.

16. The method of claim 15, further comprising identifying at least one composite feature based on a relative disposition of two or more of the identified light sources and identified low-light features.

17. The method of claim 15, further comprising identifying a flashing LED light source.

18. The method of claim 15, wherein identifying the one or more light sources comprises executing a random sample consensus algorithm.

19. The method of claim 18, further comprising organizing pixel change events in an x/y-time space.

20. The method of claim 15, further comprising correlate locations of the identified light sources and the identified low-light features in time based on time stamps of the pixel change events.

* * * * *